Patented Aug. 31, 1937

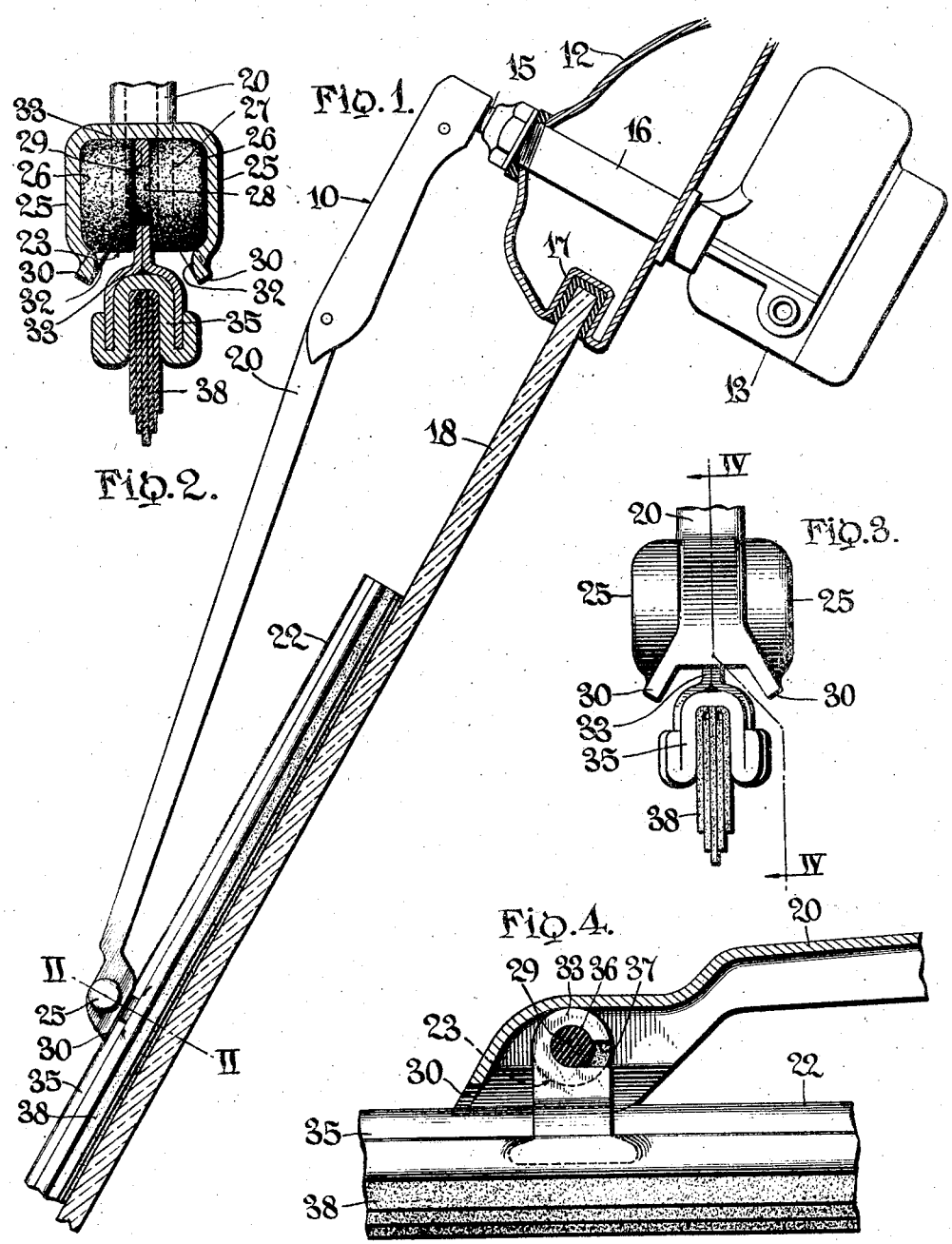

2,091,928

UNITED STATES PATENT OFFICE 2,091,928

WINDSHIELD CLEANER

Erwin C. Horton, Hamburg, N. Y., assignor to Trico Products Corporation, Buffalo, N. Y.

Application December 29, 1934, Serial No. 759,791

13 Claims. (Cl. 15—250)

This invention relates to windshield cleaners and it has particular relation to improved assemblies of wiper arm and wiper blade for such cleaners.

One object of the invention is to provide a construction of windshield cleaner in which the wiper arm and blade are so related that relative tilting action is provided therebetween without subjecting the relatively movable parts to wear or frictional bearing action.

Another object of the invention is to provide a deformable connection between the wiper arm and wiper blade.

Another object of the invention is to provide a silent and yieldable connection between a wiper arm and wiper blade that provides for relative tilting action of the blade with respect to the arm.

Another object of the invention is to provide a rigid construction of wiper arm and wiper blade adapted to receive a deformable connection for connecting such wiper arm and wiper blade.

In the type of windshield cleaners generally employed in motor vehicles, a wiper arm provided with a wiper blade pivoted thereto is oscillatable across the windshield surface. The connection between the wiper arm and blade in one popular form of construction provides for a loose or lost motion arrangement wherein the blade may tilt about its wiping edge from side to side as it oscillates across the windshield glass. Thus the blade is subjected to a flopping action which causes noise and involves considerable frictional and bearing wear upon the loose connection between the arm and blade.

This invention involves a construction in which all noise is obviated and no frictional action occurs between the elements connecting the wiper arm to the wiper blade. However, the advantages of the tilting action of the blade is maintained and this action occurs by virtue of the blade element pressing in its tilting action against a suitable yieldable material. The yielding character of the material is such as to prevent any loose connections or lost motion of the kind referred to above between the wiper arm and blade, and yet the material insures proper tilting action of the blade to provide for the most desirable angles between the blade and windshield during the operation of the windshield cleaner.

In the accompanying drawing:

Fig. 1 is a side elevation of a windshield cleaner construction embodying the invention and attached to parts of a vehicle that are shown in cross section;

Fig. 2 is a cross section taken substantially along the line II—II of Fig. 1;

Fig. 3 is a fragmentary end elevation of the wiper blade and its supporting arm; and Fig. 4 is a cross section taken substantially along the line IV—IV of Fig. 3.

Referring to Fig. 1 of the drawing, a windshield cleaner structure 10 is mounted upon a vehicle header member 12 and includes a cleaner motor 13 having an oscillatable drive shaft 15 mounted in a bearing sleeve 16 that is rigidly secured to the header member. A portion of the header member is provided with a channel 17 for receiving the upper edge portion of a windshield 18.

A wiper arm 20 secured to the outer end of the shaft 15 has a wiper blade 22 connected at its ends by means of a yieldable block 23 composed of suitable material, such as rubber, or the like. The end portion of the arm 20 is substantially in the form of a housing and is provided with opposed hollow bosses 25 defining inner opposed sockets or openings 26 for receiving opposite heads or end portions 27 of the block which is substantially cylindrical in form. A central or annular recess or groove 28 is formed in the block to provide a relatively small integral connecting neck 29 between the end portions 27. Flared flanges 30 integral with the bosses 25 and converging toward the sockets 26 define a gap 32 narrower than the distance between the opposite inner walls of the sockets 26 of the bosses. The block 23 is normally longer than the distance between the bottoms of the sockets and is deformed and forced through the gap 32 in guided relation along the inner converging surfaces of the flanges 30 and into its operative position, as illustrated in Fig. 2. Thus, in its assembled relation the block is under considerable compression with its ends pressing oppositely in the sockets 26.

A clip 33 provided rigidly upon a channel holder 35 of the blade has a transverse opening 36 therein and has a relatively smaller notch or slotted portion 37 communicating with the opening through the edge of the clip. The neck portion 29 of the block is forced under compression through the notch 37 into the opening 36 and remains under compression in the latter. Thus in the assembled relation of the block and arm the opposite end portions 27 defining the groove 28 bear under compression against the opposite sides of the clip 33 while the outer ends of the block bear under compression against the opposed walls of the socket 26.

It is, of course, to be understood that the block 23 can first be secured upon the clip by inserting the neck portion 29 through the slotted portion 37 into the opening 36, and then the block can be compressed and inserted into the sockets 26 in the manner previously described. This operation is perhaps more practical than that of first inserting the block into the sockets, although it is apparent that the invention contemplates either method of assembly.

Suitable wiper strips 38 of resilient material secured in the channel holder are adapted to be oscillated as a part of the blade structure across the surface of the windshield 16. In this oscillating motion the blade and clip 33 will be tilted from left to right as viewed in Fig. 2, and such tilting will be yieldably resisted by the compressed block 23. Since the block 23 and wiper 20 are assembled in such manner that relative movement therebetween occurs only by virtue of deformation of the block, it is apparent that the operation of the arm and wiper blade will be noiseless and that there is no danger of any of the parts becoming loose or worn. Ordinarily the sides of the blades do not contact the adjacent flanges 30 of the arm, but if the block is excessively distorted in tilting the blade beyond its normal limits of operation, these flanges will serve as stops.

From the foregoing description it will be apparent that the improved connection between the windshield wiper arm and blade provides for the assembly of these elements without the necessity of utilizing tools or manipulating fastening devices, such as nuts and bolts, screws, etc., and that the yieldable character of the connection insures uniform and silent operation of the parts. This construction also provides for attractive designing of the parts to conform with the modern tendency toward streamlining of the various portions of motor vehicles upon which the construction is adapted to be incorporated.

Although only one form of the invention has been shown and described in detail it will be apparent to those skilled in the art that the invention is not so limited, but that various changes may be made therein without departing from the spirit of the invention or from the scope of the invention defined by the appended claims.

I claim:

1. A windshield cleaner, a wiper member, an actuating member therefor, a resilient wiper supporting element resiliently interlocked with and held under compression by one of said members, and means for connecting the other member to the supporting element to establish connection between the wiper member and its actuating member.

2. A window wiper having a channeled holder, a wiper element in the channel, and a resilient connector member carried by the channeled holder and extending laterally with respect thereto in opposite directions, said connector member being transversely compressible with respect to the holder for interlocking with a cooperating wiper carrying arm.

3. A window cleaner having a wiper member, an actuating member therefor movable back and forth across a window surface and having opposed wall portions, a clip carried by the wiper member and having means for detachably interlocking the wiper member to the actuating member at a point between said wall portions, said actuating member having spaced resilient shoulders resiliently engaging the clip to support the latter out of contact with such wall portions.

4. In a windshield cleaner, a wiper arm having opposed sockets formed therein, a deformable resilient block having opposite extremities mounted in said socket, an intermediate portion of the block being recessed, and a wiper blade having a portion mounted in the recessed portion of the block and resiliently supported by the latter free from contact with any portion of the arm.

5. In a windshield cleaner, a wiper arm having opposed sockets formed therein, a rubber block mounted in said sockets, said wiper arm having flared flanges adjacent the sockets for guiding the block therebetween under compression into the sockets, an intermediate portion of the block being recessed, a wiper blade having a portion mounted in the recessed portion of the block and free from contact with the wiper arm.

6. A windshield wiper arm for coupling engagement with laterally compressible and oppositely extending parts on a wiper, said arm having a head with rigid side walls and opposing sockets in the side walls to receive such parts, said head below the sockets having guide flanges flaring outwardly from points lying substantially intermediate the end walls of the opposing sockets and defining retaining shoulders with the side walls of the sockets, whereby said parts may be seated on and compressed by said guide flanges as they are introduced therebetween and moved into the sockets.

7. In a windshield cleaner, a wiper member, an actuator therefor, and a resilient element mounted under compression on one of said members and supporting the other of said members free and independent of the companion member.

8. A window cleaner having a wiper member, an actuating member therefor movable back and forth across a window surface, and a resilient pin extending transversely of said wiper member and serving to connect the latter to the actuating member, said wiper member being supported by said resilient pin free of said actuating member whereby the wiper may assume a dragging position with respect to the actuating member when the latter is moving back and forth across the window.

9. A window cleaner having a wiper member, an actuating member therefor movable back and forth across a window surface, and a resilient pin extending transversely of said wiper member and serving to connect the latter to the actuating member, said resilient pin having spaced confining enlargements on opposite sides of one of said members, serving to support the wiper member at a normal with respect to the window surface.

10. A window cleaner having a wiper member, an actuating member therefor movable back and forth across a window, and a rubber body carried by the actuating member and provided with spaced shoulders, the wiper member having a part engageable with the rubber body between said shoulders, said shoulders being yieldable to permit the wiper member to drag with respect to the actuating member and serving to normally urge the wiper member to an erect position on the window surface.

11. A window wiper for attachment to a wiper carrying arm in which are formed opposed sockets, said wiper having lateral resilient enlargements compressible for introduction into the sockets and subsequent interlock therewith.

12. A window wiper having a transversely extending and transversely compressible rubber pin across its back for interlocking with a cooperating wiper carrying arm.

13. A wiper carrying arm provided on its outer extremity with a transversely extending rubber block formed with spaced resilient enlargements to receive therebetween an attaching part carried by a wiper blade, said enlargements attached to yield laterally to permit the blade assuming a dragging position with respect to the arm.

ERWIN C. HORTON.